Dec. 16, 1969  F. H. SMYTHE, JR  3,483,693
ADJUSTABLE HOROLOGICAL BALANCE BRIDGE
Filed Jan. 22, 1968
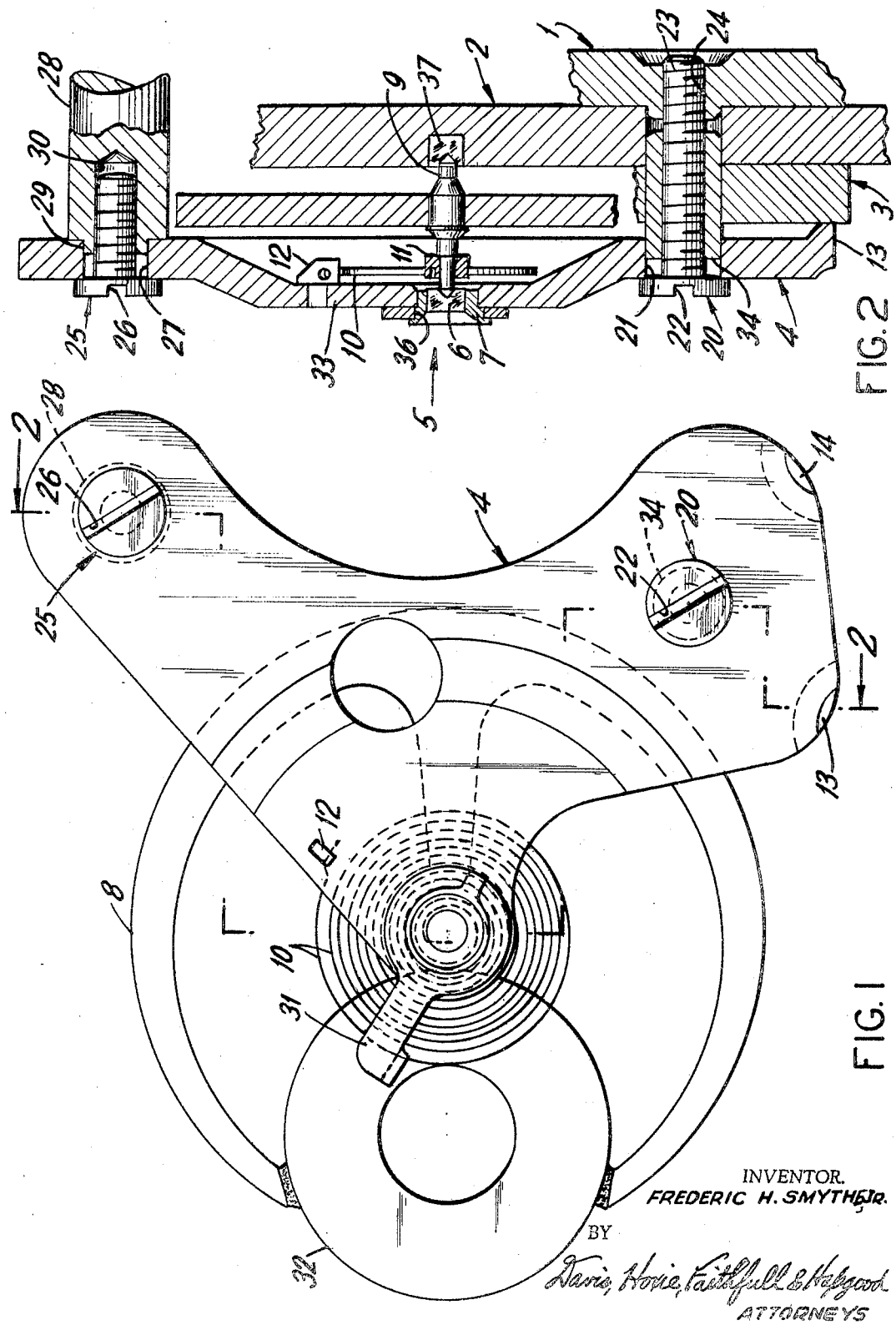
INVENTOR.
FREDERIC H. SMYTHE, JR.
BY
ATTORNEYS

United States Patent Office 3,483,693
Patented Dec. 16, 1969

3,483,693
ADJUSTABLE HOROLOGICAL BALANCE BRIDGE
Frederic H. Smythe, Jr., Watertown, Conn., assignor to The United States Time Corporation, Waterbury, Conn., a corporation of Connecticut
Filed Jan. 22, 1968, Ser. No. 699,393
Int. Cl. G04b 17/06
U.S. Cl. 58—107                            3 Claims

ABSTRACT OF THE DISCLOSURE

A horological movement includes a frame plate having one pivot and a balance bridge having a second pivot. The staff of a balance wheel rotates in the two pivots. The balance bridge is axially adjustable relative to the frame plate by means of a screw arrangement. The balance bridge includes integral supporting feet at its adjustable end.

---

The present invention relates to horological instruments and more particularly to an adjustable balance bridge for such instruments.

The timekeeping of a horological instrument is usually dependent upon an oscillatory regulating member. In a watch, the oscillatory member is usually a balance wheel which is fixed to a balance wheel staff. The balance wheed staff is pivated between two supports, usually between a frame plate and a balance bridge connected to a frame plate. The balance wheel staff usually rotates in jeweled bearings which provide a bearing surface for rotation and restrict the axial motion of the staff. The balance wheel is caused to oscillate by the power of a mainspring, an electric battery, or other power sources.

It is important that the bearings of the balance wheel staff be axially adjustable. If the balance wheel staff has too much axial play, i.e., if the staff is free to move too far axially, it may cause escapement failures, position errors in the watch rate, and the bearing or the staff may be injured if the watch is subjected to shocks. If the staff does not have sufficient axial play, the balance wheel may not be able to swing with a sufficiently large oscillation for good timekeeping and power may be wasted.

It has been a conventional practice in watchmaking to provide that one of the members carrying a balance staff jewel may be axially adjustable. The adjustment should be able to be changed so that one or more adjustments may be made at the factory and additional adjustments may be made, if necessary, by repairmen. The adjustable member is called the balance staff bridge and its axial adjustment is often referred to as an end-shake adjustment.

Many types of balance bridge end-shake adjustment arrangements have been proposed. For example, an inexpensive balance staff bridge may include a simple nut and screw arrangment. However, the watchmaker or watch repairer may injure one of the jewels by turning the screw too far. The screw may also be rotated, when the watch is worn, by vibrations and shocks, causing the loss of the balance bridge adjustment.

Some balance bridges in watches have been provided with a "positive" adjustment. A positive adjustment is a mechanism which locks the balance bridge in position after it has been adjusted. However, such positive mechanisms have been relatively expensive, difficult to manufacture, and required additional parts and assembly.

It is the objective of the present invention to provide a balance bridge which is repeatedly adjustable; which may be positively locked in position after its adjustment; which is relatively inexpensive to manufacture; which requires relatively few parts; and which is relatively simple for the watchmaker or watch repairer to adjust.

In accordance with the present invention, a balance bridge is provided on which a jewel is positioned. The balance bridge and a frame plate carrying a second bearing provide the pivots for the balance wheel staff.

The balance bridge construction includes three particular measures. First, the balance bridge is spaced away from the frame plate or a spacing member on the frame plate by one or more integral feet members. Secondly, the center portion of the balance bridge is thinner than its ends, to provide flexibility. Thirdly, the jewel is located in the balance bridge at one side and away from the line between the adjusting screw and the holding screw.

The bridge is locked in its correct position by an adjusting screw mechanism. The watchmaker, to adjust the bridge, turns the screw until the correct axial spacing is obtained. This locks the bridge in position due to the upward spring force of the balance bridge.

Other objectives of the present invention will be apparent from the following detailed description of a preferred embodiment of the present invention taken in conjunction with the accompanying drawings.

In the drawings:

FIG. 1 is a top plan view of an embodiment of the present invention showing a portion of the bridge and a portion of the frame plate; and FIG. 2 is a side view of the embodiment of the present invention of FIG. 1 taken along lines 2—2.

The embodiment of the present invention, shown in FIGS. 1 and 2, includes a dial plate 1 and a front frame plate 2 of a watch or other horological instrument. The frame plate 2 is the main frame plate of the instrument, but it may alternatively be a bridge member of the main frame plate. A train bridge 3 is positioned over part of the front frame plate 2.

A balance bridge 4 is positioned over the train bridge 3. The portion of the train bridge shown in FIG. 2 acts as a spacing means to separate the balance bridge 4 from the frame plate 2. The balance bridge 4 includes a top jewel bearing assembly 5 comprising a single bearing jewel 6 having a V-shaped cavity (in cross-section) for journaling (rotation) and for thrust. Jewel 6 is mounted in a holding ring 7. The bearing assembly may, however, be of other constructions.

A balance wheel 8 is fixed on a balance wheel staff 9. Balance wheel 8 is kept in oscillation by a flat spiral return spring 10. The balance wheel is impulsed from a mainspring (not shown) or carries a coil 32 which is part of an electrical motive system including a battery (not shown). One end of spring 10 is attached to the balance wheel staff hub 11 and the other end is attached, by a pin, to flange member 12 which is fixed in a hole in the balance bridge 4. The oscillation of the balance wheel 8 provides timekeeping regulation. The balance wheel staff 9 is positioned between the top bearing jewel assembly 5 and a bottom jewel 37 within the front frame plate 2. A regulator 31, having an arm and a hole 36, provides timekeeping corrections. The hole 36 of regulator 31 fits over the ring 7.

A first foot 13 of the balance bridge 4 is used as one of the supports for one end of the bridge. A second foot 14 is opposite the first foot 13 at one end of the balance bridge 4. The feet 13 and 14 are relatively strong and support the balance bridge 4 away from the train bridge 3. The space above the train bridge 3, formed by the feet 13 and 14, permits the balance bridge to move closer to the train bridge 3 upon inward, i.e., tightening, adjustment of the balance bridge.

The balance bridge 4, seen in cross-section as in FIG.

2, has a raised center portion 33. The center portion 33 is preferably thinner than its integral end portions. The center portion 33 contains the jewel assembly 5. The thinning of the center portion 33 renders the center portion relatively flexible.

A tightening screw 20 is positioned with a hole 21 of the balance bridge 4. The screw 20 has a head with a slot 22 for turning and a shank 23 having exterior screw threads along its entire length. The screw threads screw into the threads of hole 24 of the dial plate 1. The screw 20 may have other forms, such as having its top a Phillips head, or the shank may be threaded with exterior screw threads for only its bottom portion and the rest of the shank smooth. The screw shank 23, at its center portion is covered by a tubular pillar 34. The pillar 34, which fits within the hole 21 of the balance bridge 4, serves to locate the balance bridge during the assembly of the movement.

The end of the bridge 4, opposite the feet 13 and 14, is fixed. However, instead of one end of the bridge being fixed and the other adjustable, both ends may be made adjustable utilizing two adjusting screws and feet at both ends of the bridge.

The opposite end of the balance bridge 4 is supported on a pillar 28. A screw 25, having a slot 26, is within a hole 27 (with clearance) of the balance bridge 4. The pillar 28, having a raised central portion 29, is attached to the balance bridge by the threading of screw 25 within a cavity 30 of the pillar 28. The central portion 29 fits within the hole 27 of the bridge 4 to locate the bridge before it is fastened down.

The shape of the balance bridge 4 somewhat resembles, from the top view, a triangle. The feet 13 and 14 and the adjusting screw 20 is near one vertex, the pillar screw 25 is near a second vertex, and the jewel assembly 5 is near a third vertex.

Modifications may be made in the present invention.

I claim:
1. A horological instrument including a balance wheel mounted on a staff, a frame member carrying a first pivot for said staff, and a bridge spaced from said frame member and carrying a second pivot for said staff; said bridge being fixed at one end adjustable at an opposite end;
   said bridge including at least one integral foot at its adjustable end to space said bridge from said frame member;
   adjusting means between said fixed end and said foot, said adjusting means including a screw adjustably connecting said bridge and said frame member and adapted to axially adjust the adjustable end of said bridge relative to said frame member;
   wherein said bridge carries its said pivot in its center portion substantially mid-way from said ends and separated from and off-set relative to the line between the said ends.
2. A horological instrument as in claim 1 wherein said bridge is thinner in cross-section at its center than at its ends to provide flexibility.
3. A horological instrument as in claim 1 wherein said bridge has its pivot carrying portion in its center portion and said center portion is raised relative to said frame as compared to the ends of said bridge.

References Cited
UNITED STATES PATENTS
3,393,506   7/1968   Garbe _____ 58—140 X RICHARD B. WILKINSON, Primary Examiner GEORGE H. MILLER, JR., Assistant Examiner U.S. Cl. X.R.

58—140